United States Patent
Irwin

[11] 3,719,979
[45] March 13, 1973

[54] LINEAR MOTION ANTI-FRICTION BEARINGS

[75] Inventor: Arthur S. Irwin, Bemus Point, N.Y.

[73] Assignee: TRW Inc., Cleveland, Ohio

[22] Filed: May 17, 1972

[21] Appl. No.: 254,157

Related U.S. Application Data

[63] Continuation-in-part of Ser. No. 71,523, Sept. 11, 1970.

[52] U.S. Cl. .........29/148.4 A, 29/148.4 C, 113/117, 308/6 C
[51] Int. Cl. ..................B23p 11/00, B21d 53/12
[58] Field of Search ...29/148.4 A, 148.4 C; 308/6 C; 113/117

[56] References Cited

UNITED STATES PATENTS

| 2,503,009 | 4/1950 | Thomson | 113/117 X |
| 2,509,749 | 5/1950 | Thomson | 308/6 C |
| 2,576,269 | 11/1951 | Thomson | 308/6 C |
| 2,628,135 | 2/1953 | Magee | 308/6 C |
| 3,005,665 | 10/1961 | Thomson et al. | 308/6 C |

*Primary Examiner*—Thomas H. Eager
*Attorney*—Benjamin H. Sherman et al.

[57] ABSTRACT

A method of making a linear motion bearing wherein the housing is formed with a varying radius inner diameter providing ball loading and ball return portions, the bearing radius continuing axially of the housing, a ball retainer received in the housing, the ball retainer having pathways impressed in an outer surface thereof, the pathways terminating in spaced relation to the axial ends of the retainer and portions of the retainer intermediate the ballways and the axial ends having a varying radius outer surface which mates with the varying radius inner surface of the housing to lock the retainer against rotation in the housing.

10 Claims, 18 Drawing Figures

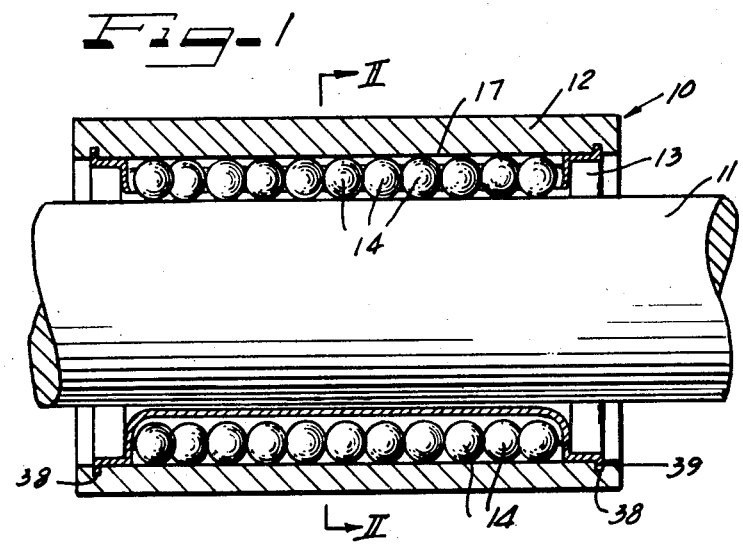
Fig-1
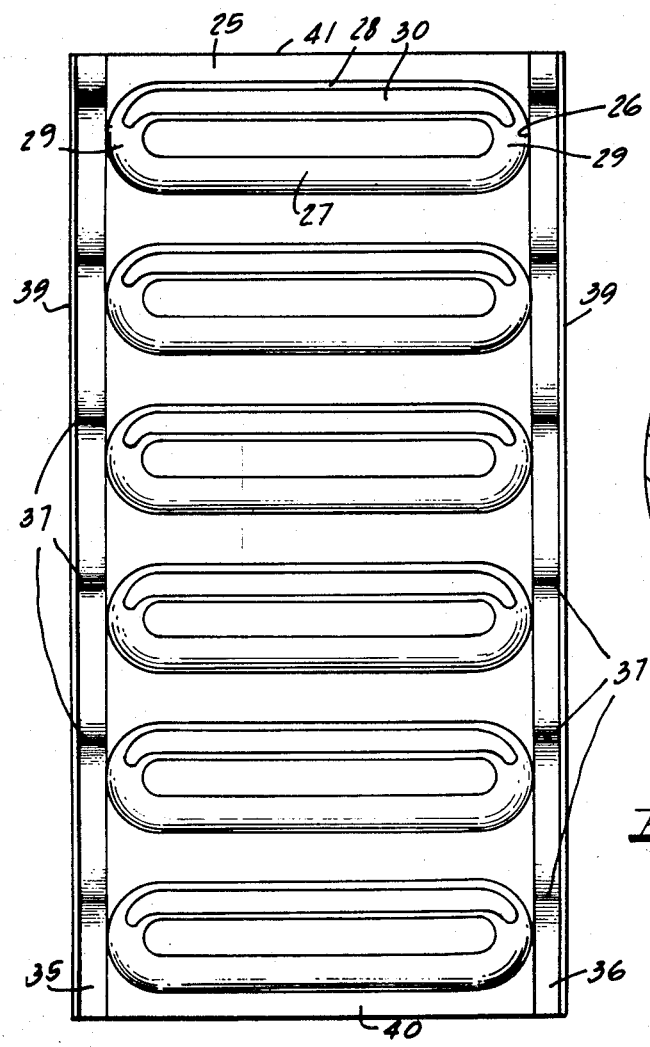
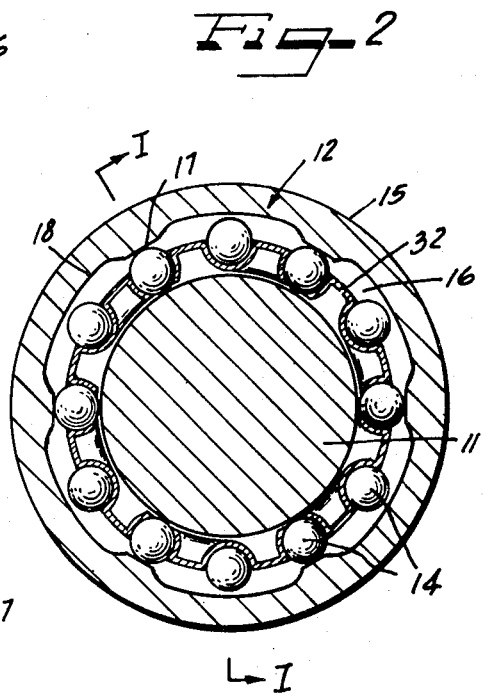
Fig-2
Fig-3

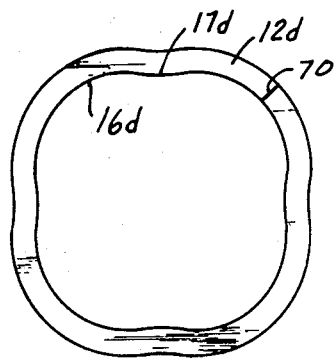
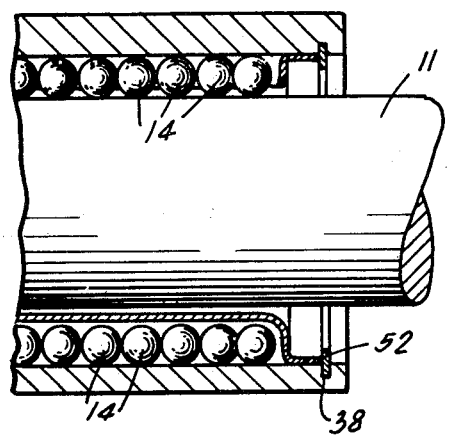
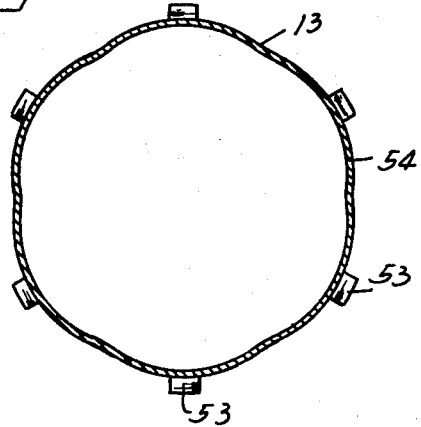
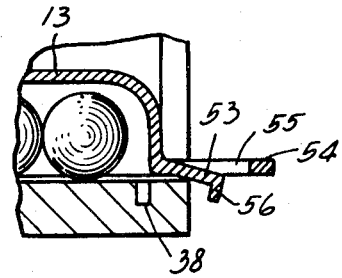
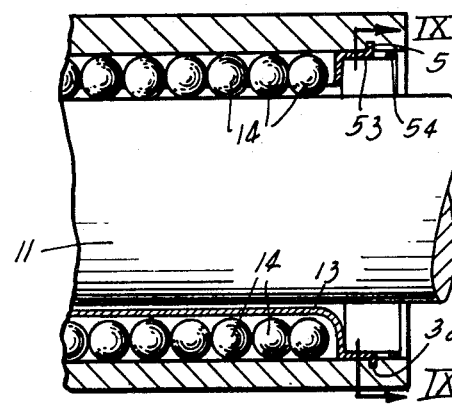

LINEAR MOTION ANTI-FRICTION BEARINGS

CROSS-REFERENCE TO RELATED APPLICATIONS

This application is a continuation-in-part of application Ser. No. 71,523 entitled "LINEAR MOTION ANTI-FRICTION BEARING AND METHOD OF MANUFACTURING," filed Sept. 11, 1970.

BACKGROUND OF THE INVENTION

1. Field of the Invention

This invention relates to anti-friction bearings and more importantly to a method of making a linear motion anti-friction bearing.

2. Prior Art

Linear motion anti-friction bearings are old in the art. A popular method of manufacturing such bearings is to provide a variously configured strip of metal which acts as a ball guide and retainer. The strip is formed into an annular split retainer which is then received around a shaft with the balls entrapped between the shaft and the retainer. Such a construction is illustrated in the U.S. Pat. to J. B. Thomson, No. 2,509,749. It has also been known to provide a plurality of metal strips which are received within a cylindrical bore in a housing. (See for example the U.S. Pat. to J. B. Thomson No. 2,503,009.) These two methods have been combined to provide a continuous strip ball retainer received in a housing. (See for example the U.S. Pat. to R. C. Magee, No. 2,628,135.)

In most such prior art linear motion bearings, the ball retainer has a plurality of longitudinal slots therethrough having a width less than the diameter of the balls. Radially outwardly from the slots is an inwardly offset radially depressed area of the housing which then contacts the balls to press them into engagement with the shaft through the longitudinal slots of the retainer. Circumferentially spaced from the slotted areas are depressions in the retainer which act as ball return paths and lie radially inwardly from portions of the housing which are not depressed, thereby giving greater radial clearance.

It has additionally been known to provide a varying thickness housing rather than one with depressed areas. (See for example the U.S. Pat. to J. B. Thomson et al. No. 3,005,665.) Where such a housing is provided, the inner wall thereof presents an undulated circumferential path. In order for the bearing to work, the retainer section must be maintained in circumferential alignment with the undulations so that the radially thickest portions of the housing overlie the slotted portions of the retainer. Further, axial movement of the retainer within the housing must be prevented in order to restrain the housing from moving off of the retainer, thereby allowing the balls to drop out.

Radial and axial stability has sometimes been accomplished through the use of integral end tabs which have tongues mating with grooves on the housing as in the U.S. Pat. to Ferger No. 2,452,117, or screws extending through the housing and ball retainer as in the U.S. Pat. to J. B. Thomson, No. 2,576,269.

SUMMARY OF THE INVENTION

This invention overcomes the deficiencies in the prior art and provides the means for preventing axial movement and radial rotation of the ball retainer without the necessity of integral or attached end caps or fastening devices such as screws or lock pins which can become loose. The invention may utilize a broached or extruded housing having a varying thickness to provide a plurality of circumferentially spaced longitudinal bearing lands separated by increased radius return paths.

The radius variations extend the entire length of the housing, thereby reducing the manufacturing cost of the housing. The ball retainer is a strip of metal which is formed with a planar central section which has the ball paths formed therein. The central section is bordered on either end with a varyingly configured portion providing an undulating path and terminating in an out-turned flange at the end of the retainer. When the retainer is formed into a split tubular shape, the undulations of the portions match the undulations of the varying thickness of the housing to lock the retainer against rotation while the flange is adapted to snap into a groove adjacent the axial ends of the housing to lock the retainer against axial movement. In another embodiment, the retainer may eliminate the flanges and be held in place with a snap ring or it may have spring fingers which snap into the retaining groove.

My invention also discloses a method of manufacturing the above-described linear motion bearing. The use of a varying radius inner diameter in the housing, which varying radius continues axially throughout the entire axial length of the housing, allows the housing to be produced in economical fashion.

In some embodiments, the housing is initially formed from a tube. The tube can be formed by any of a number of manufacturing steps. One embodiment constricts the tube material to form the finished interior housing. Disclosed is the use of a mandrel having a varying radius outer diameter. The tube is received over the mandrel and may thereafter be subjected to a swedging operation or a forging or pressing operation to flow metal from the tube into conformity with the outer diameter of the mandrel. Thereafter, if desired, the outer diameter of the tube may be machined to circular dimentions.

In another embodiment, the tube may be drawn through a die having a varying radius inner diameter to constrict the tube material into conformity with the varying radius, thereby providing a varying radius inner diameter. In the latter method, the outer diameter would therefore conform with the inner diameter in a series of non-concentric arcs. The outer diameter can thereafter be subjected to a machining operation to remove material outward from the unloaded portions of the ball paths to provide a common center whereby the housing can be received in a cylindrical opening. Further, the inner diameter could be subjected to a machining operation to provide flat lands or axially grooved or curved surfaces, to better conform to the ball surfaces and increase the load carrying capacity for use as the ball loading portions of the ballways.

In yet another embodiment, the housing can be constructed from an initially flat strip which is impressed with a series of ridges and valleys corresponding to ball loading and unloaded portions, the flat strip thereafter rolled to provide the housing. The abutting edges may be joined as by welding. In other described embodiments, the housing is machined or broached.

It is therefore an object of this invention to provide an improved linear motion anti-friction bearing.

It is a specific object of this invention to provide a linear motion anti-friction bearing having a housing with a varying radius inner diameter receiving a split tubular retainer having a portion thereof with a varying radius outer diameter to index with the inner diameter of the housing.

It is yet another and more specific object of this invention to provide a linear motion anti-friction bearing including a substantially tubular housing with a convoluted interior diameter providing alternate circumferentially spaced ball loading and return path longitudinal sections and a ball retainer having a substantially circumferential central portion with ball paths provided therein and marginal portions at either end of the ball paths having radial corrugations dimensioned to index with the undulations of the interior diameter of the housing to prevent rotation of the retainer in the housing.

It is another specific object of this invention to provide a linear motion anti-friction bearing having a housing with radial grooves adjacent either end thereof and a ball retainer with an out-turned flange at either end thereof dimensioned to be received within the grooves to limit axial movement.

It is yet another specific object of this invention to provide a linear motion bearing having a tubular housing with internal radial grooves adjacent either end thereof and a ball retainer received therein with spring fingers adjacent either end thereof adapted to lock in the grooves to prevent axial movement of the retainer with respect to the housing.

It is another object of this invention to provide an improved method of manufacturing a linear motion bearing.

It is a more specific object of this invention to provide a method of manufacturing a linear motion bearing which comprises only a housing, a retainer and anti-friction elements.

It is a further object of this invention to provide a method of manufacturing a linear motion bearing wherein the housing is formed by broaching a tube.

It is another object of this invention to provide a method of manufacturing a linear motion bearing wherein the housing is provided by die formation.

It is a further object of this invention to provide a method of manufacturing a linear motion bearing wherein the housing is provided by constricting material around a mandrel.

It is another object of this invention to provide a method of manufacturing a linear motion bearing wherein the housing is formed from a rolled strip of sheet material pre-impressed with transversely extending parallel ball loading lands and unloaded ball return lands.

It is a most specific object of this invention to provide a method of manufacturing a linear motion bearing by the steps of first providing a housing with a varying radius inner diameter, the inner diameter consisting of circumferentially alternating smaller radius ball loading lands and larger radius unloaded ball return lands, the lands extending axially of the housing, forming a retainer with an outer surface having a plurality of ball pathways impressed therein, portions of the pathways extending through the material of the retainer, undulating axial end portions of the retainer to mate with the varying radius inner diameter of the housing, filling the pathways with bearing anti-friction elements, and inserting the retainer into the housing aligning the portions of the ball pathways with the bearing loading lands and mating the axial end portions of the retainer with the varying radius of the housing to lock the retainer against rotation within the housing.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a longitudinal cross-sectional view of a linear motion anti-friction bearing according to this invention received on a shaft.

FIG. 2 is a transverse cross-sectional view of the anti-friction bearing of FIG. 1, taken along the lines II—II of FIG. 1.

FIG. 3 is a plan view of the retainer strip of the anti-friction bearing of FIGS. 1 and 2 prior to rolling of the strip.

FIG. 8 is a fragmentary cross-sectional view of a modified form of the invention illustrating the use of a snap ring.

FIG. 9 is an end plan view of a modified form of the retainer of this invention.

FIG. 10 is a fragmentary cross-sectional view of an end of the housing and retainer of the modified form of this invention illustrated in FIG. 9.

FIG. 11 is a fragmentary cross-sectional view of the modified form of the invention of FIGS. 9 and 10 received around a shaft.

FIG. 12 is a view similar to FIG. 7 illustrating another embodiment of the housing made from rolled sheet material.

DESCRIPTION OF THE PREFERRED EMBODIMENTS

Figure 4:
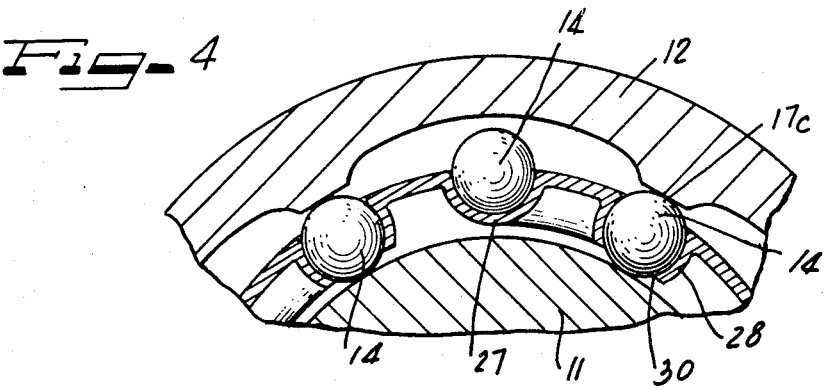
FIG. 4 is a fragmentary cross-sectional view similar to the view of FIG. 2 but on a larger scale, illustrating an extruded or broached housing.

FIG. 1 illustrates the linear motion anti-friction bearing 10 of this invention received around a shaft 11. The bearing 10 consists of a housing 12, a retainer 13 and a plurality of bearing balls 14.

As best illustrated in FIG. 2, the housing 12 is a cylindrical tube or sleeve having a constant outer diameter 15 and a varying inner diameter 16. The inner diameter 16 has a plurality of circumferentially spaced ball loading faces 17 extending the axial length of the housing 12. The ball loading faces 17 have a circumferential dimension which is substantially flat or formed along a radius. The ball loading faces 17 are circumferentially spaced by increased diameter return path areas 18. The alternating ball loading faces 17 and return path areas 18 provide for a currugated or undulating inner diameter 16 for the housing 12. The undulations or currugations extend the entire length of the housing.

In the case of the housing illustrated in FIG. 2, the housing 12 may be extruded to form a constant outer diameter 15 with the desired corrugated inner diameter 16. In such case, the housing may be of a non-metallic material or may be extruded metal. The use of such an extrusion reduces the amount of machining necessary to produce the housing and allows formation of the flat land 17.

Figure 6:
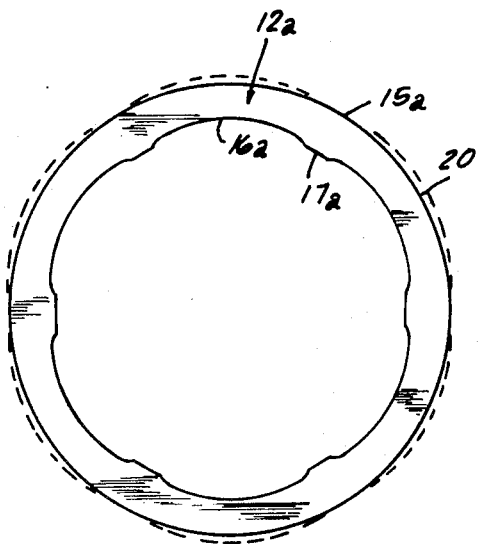
FIG. 6 is an end plan view of a housing formed as on a mandrel indicating by dotted lines material removed as by circumferential grinding.

FIG. 6 illustrates a second form of the housing which is formed by circumferential displacement of substantially tubular housing material around a mandrel. The mandrel 80 in FIG. 72 will have an exterior configuration corresponding to the desired interior configuration of the housing and the housing will be reduced around it as by pressing or swedging to produce an interior diameter having the bearing lands 17a and ball return spaces 16a which will correspond to the outer diameter of the mandrel. Use of the mandrel with a swedging operation will cause a cold flow of the material of the housing 12a which may result in a constant outer diameter 15a. However, pressing of the housing around the mandrel, especially if done by a forge or opposed dies having internal configurations corresponding to the external configurations of the mandrel, will form a non-circular external diameter having raised portions 20. These portions can be removed by machining to provide a constant diameter outer surface where that is desired for installation reasons.

Figure 7:
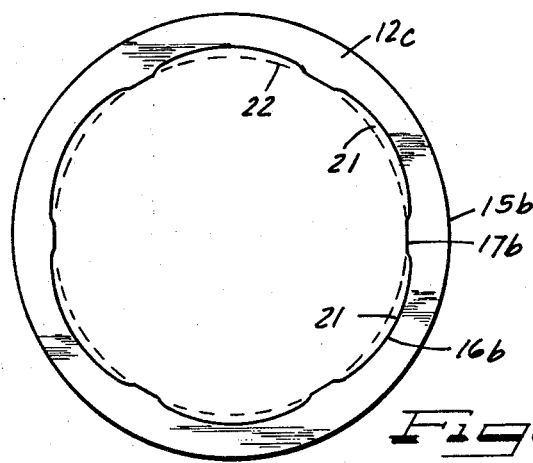
FIG. 7 is a view similar to FIG. 6 illustrating a housing formed as by broaching with dotted lines indicating material removed during formation.

FIG. 7 illustrates a third embodiment of the housing. The housing 12b is formed initially as a cylindrical tube having a constant wall thickness and a cylindrical outer diameter 15b. Thereafter, portions 21 of the material of the original inner diameter 22 are removed as by broaching to provide the circumferentially alternating ball loading land 17b and ball return spaces 16b.

FIG. 12 illustrates a modified housing 12b which is formed from rolled sheet material with abutting ends 70. The rolled sheet material is undulated to provide alternating ball loading lands 17d and ball return spaces 16d. Where this modification is utilized, the edges may be seam-welded. However, if mounted in a specifically designed bracket or housing, the edges may be left abutted with the bracket pinching them together. In this embodiment, the outer diameter is not a continuous circle as has been described as preferred in the other embodiments. It is to be understood, of course, that these are preferred only and that in the case of different mounting configurations, they may be formed into a non-circular outer diameter as by not machining the embodiment of FIG. 6.

As illustrated in FIG. 4, where it is desired to have chordally flat ball loading lands 17c as opposed to radially flat lands, this can be accomplished either by use of a desired formed mandrel or extruding die in the case of the housings 12 and 12a, or by machining during broaching as in the case of the housing 12c. It is of course to be understood that the extra machining operation to produce the chordally flat ball loading lands may be used in connection with either the housing 12 or 12a.

FIGS. 13, 14, 15 and 16 illustrate a preferred method of manufacturing the housing by an extrusion or die formation process.

Figure 13:
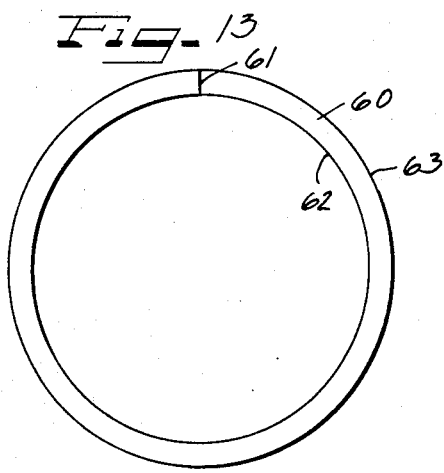
FIGS. 13, 14, 15 and 16 illustrate a method of manufacturing the housing from a tube or rolled sheet by means of a die.

Preferably the housing begins as a rolled strip 60 which has abutting ends 61 which may be seam-welded if desired. The strip has an appreciable thickness to provide a dimensionally stabled housing after rolling and forming. As illustrated in FIG. 13, the rolled strip 30 is initially formed to tubular shape with concentric inner 62 and outer 63 diameters.

The strip 60 is then subjected to a die 65, which may be an extruding die or a drawing die, or the like. The die 65 has an inner surface 66 which has a plurality of lobes 67 formed therein. The lobes may, for example, be formed by equidistantly spacing a number of points 69 from a common center 68 and then drawing equal radius arcs 70 from the point 69. The lobes are then drawn from intersecting circles and are dimensioned to be spaced from the intersecting points 71 such that the depth of the lobes 67 provides for the formation of a housing with ball return paths.

Figure 14:
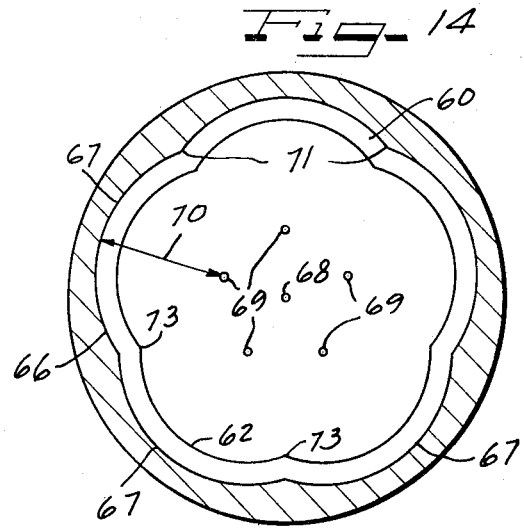

Thereafter, subjecting the rolled sheet housing 60 to the die either in an extruding or a drawing process will conform the rolled sheet housing to the lobed formation of the inner surface of the die as illustrated in FIG. 14. It will be understood that either a cold or a hot draw or extrusion can be used, depending upon the material chosen for the housing and the wall thickness. As the rolled sheet housing 60 is passed through the die, the inner diameter 62 of the housing will be formed into a series of lobes corresponding with the lobes of the die.

Figure 15:
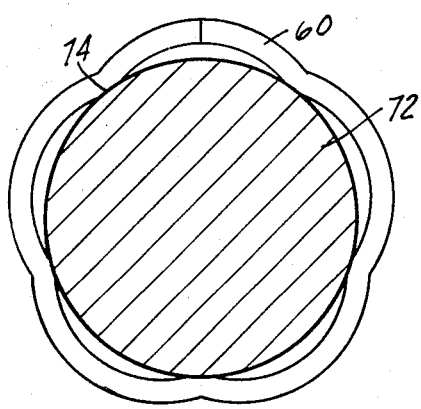

As illustrated in FIG. 15, the housing 60 can thereafter be subjected to a grinding or other machining operation as illustrated by the grinding wheel 72 to flatten the inner diameter peaks 73 formed at the intersecting points 71 of the lobes. This will then provide ball loading lands 74 at the intersection of the lobes. The lands formed by a grinding wheel such as illustrated at 72 will be arcuate to the center of the housing. As has been previously explained, the ball loading land 74 could be cut or ground to other contours if desired.

Figure 16:
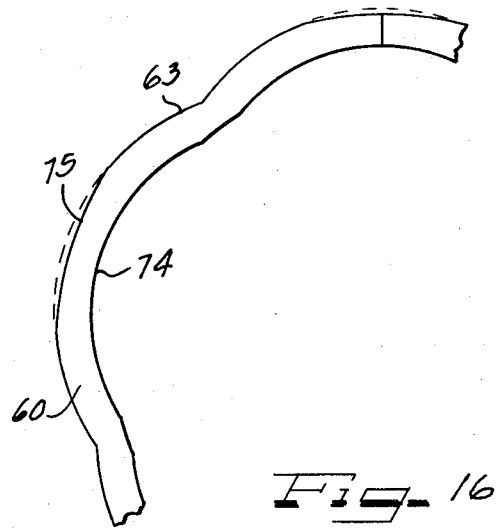

Thereafter, as illustrated in FIG. 16, the outer diameter 63 can be subjected to a grinding, machining, or other operation which will reduce the thickness of the housing 60 outwardly of the ball return path portions 74 of the lobes. This grinding operation will remove a portion of the material of the housing as illustrated at 75. Preferably, each lobe portion of the outer diameter is ground from a common center point to provide a finished housing which has large outer surface areas which are concentric. Thus, the housing can be received in a tubular bore machinery member fitting. The amount ground away is preferably such that material will be removed only from the outer diameter portion radially beyond the ball return paths. Thus, the outer diameter may not be circular inasmuch as the outer surfaces of the ball loading lands will still be radially inset from the outer surface of the ball return paths. By removing material only from the outer surface of the ball return paths, the housing is not weakened in the area of greatest stress, i.e., the ball loading areas.

Figure 17:
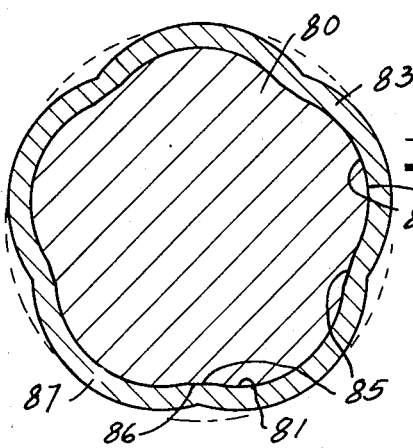
FIG. 17 illustrates a method of manufacturing the housing by constricting housing material around a mandrel.

FIG. 17 illustrates the mandrel method of formation wherein a mandrel 80 has an outer diameter surface 81 which has a plurality of circumferentially arcuate axially extending raised ridge portions 82. The housing member 83, which may initially be tubular, is received around the mandrel and is thereafter subjected to a pressing operation to constrict it into conformity with the outer surface of the mandrel. The method of constricting the material of the housing may vary. For example, the housing member may be subjected to a spin-swedging operation, a hydraulic pressing operation, a vacuum suction operation through openings in the mandrel or may be received between closing mating dies. In any event, the inner diameter 84 of the housing member 83 will be pressed against the outer surface 81 of the mandrel and will conform in shape with the outer surface of the mandrel.

The outer surface 81 of the mandrel is preferably formed with flat or other ball contacting contour axially extending lands 85 between the raised ridge portions 84. The flat or other contour lands 85 will cause corresponding lands 86 on the inner diameter surface of the housing 83. These lands then form the ball loading faces 17 of the housing and the greater diameter portions 87 of the housing caused by mating with the raised ridges 82 will form the ball return areas 18 of the housing as illustrated in FIG. 6. If desired, the outer diameter surface of the resultant housing may be treated as illustrated in FIG. 6 by removal of portions of the outer surface of the raised portions 83, 20 to provide a circular outer surface. Alternatively, only portions thereof may be removed as described above in connection with FIG. 16. It will be understood that although FIG. 17 illustrates a housing member 83 initially formed of a continuous wall tube, a rolled housing blank as illustrated in FIG. 13 may be used.

Figure 18:
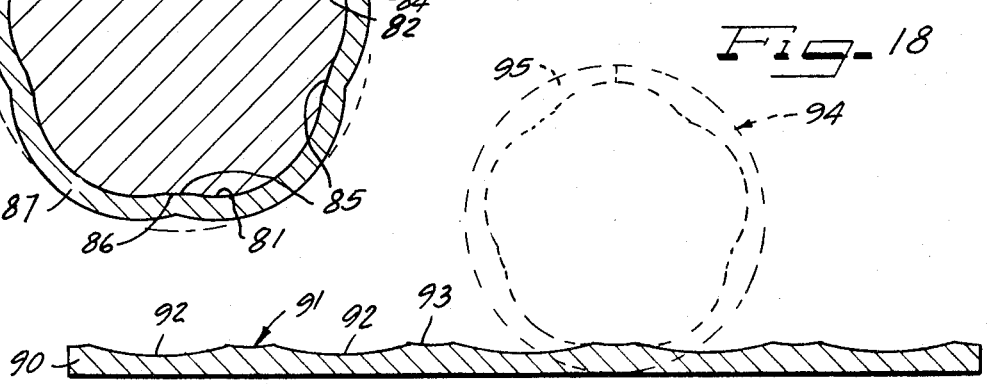
FIG. 18 illustrates a method of manufacturing the housing by impressing a flat sheet with contours and thereafter rolling it.

FIG. 18 illustrates another method of manufacturing the housing. Initially, the housing begins as a flat strip 90 of sheet material having a given thickness. Thereafter, one face 91 of the housing is machined or rolled to provide a varying surface consisting of alternate large radius deep grooves 92 and shallow grooves 93. The deep grooves 92 are wider than the shallow grooves 93. The shallow grooves 93 may be flat or other ball contacting contour lands if desired to form the ball loading faces as hereinafter described.

The deeper grooves 92 are formed into the material of the sheet 90 a depth sufficient to provide return path areas. After formation of the contoured surface 91, the sheet is rolled as illustrated by the broken lines 94 with the surface 91 forming the inner surface of a tube 95. Thus, the portions 93 of the flat sheet will form the ball loading faces 17 and the deeper grooves 92 will form the ball return path areas 18. The housing may be seam-welded after rolling if desired.

After formation of the housing by one of the above-described methods, a retainer is formed which has oval ball pathways impressed into the outer surface thereof, with spaces between the axial ends of the oval ball paths and the axial ends of the retainer. These spaces are undulated as hereinafter described to mate with the varying diameter inner surface of the housing to lock the retainer against rotation. Thereafter, the pathways are filled with anti-friction elements such as balls and the retainer is inserted into the housing.

The ball retainer 13 is preferably a strip of sheet metal having a width slightly shorter than the axial length of the housing. The central section 25 of the retainer has a plurality of depressed oval ballways 26 therein with the major axis of the oval extending across the width. The oval is divided into two longitudinal stretches or ballways 27 and 28 interconnected by turnaround or return U-shaped paths 29 at either end thereof. The ballway 28 is initially formed deeper than the ballway 27 and has its bottom section 30 cut out to allow a portion of the balls in the ballway to project therethrough as is best illustrated in FIG. 4. The cut-out portion extends partially into the end paths 29 which have a sloped depth extending from the relatively shallow depth ballway 27 to the deeper depth ballway 28.

The oval ballways 26 may be formed as by punching, using dies suitably formed to provide the ballway configurations.

The number of ballways provided in the sheet correspond to the number of sets of ball loading lands 17 and ball return paths 16 in the inner diameter of the housing. The oval ballways are spaced from one another lengthwise of the sheet 13 so that when the sheet is rolled into a cylindrical formation and inserted into the housing, the open ballways 28 will be aligned with the ball loading lands 17 and the shallower closed ballways 27 will be aligned with the return path lands 16.

When the retainer 13 is rolled and inserted into the housing 12, a split end gap 32 is provided by making the retainer sleeve slightly shorter then the final circumference. This allows the retainer sleeve to be compressed to smaller than operating diameter for insertion into the housing. Of course, the retainer may be longer and the ends overlapped.

Portions 35 and 36 of the retainer sheet projecting axially from the ends of the ballways 26 are provided with corrugations or undulations corresponding to the undulations of the inner diameter wall of the housing created by the circumferentially alternating ball loading lands 17 and ball return paths 16. The corrugations 37 will then index with the corrugations of the inner diameter wall of the housing to lock the ball retainer 13 therein, preventing rotation. This will ensure that the balls in the path 28 are retained in a position radially inwardly from the ball loading lands 17 and that the path 27 is retained radially inwardly from one of the ball return areas 16.

In order to prevent axial movement of the retainer 13 in the housing 12, in the embodiment illustrated in FIGS. 1 and 2, grooves 38 are provided in the inner diameter wall of the housing 12 adjacent the axial ends thereof. Marginal axial end portions 39 of the retainer are then bent so as to provide radial flanges when the retainer is rolled to its operating shape. By compressing the gap 32 until the ends 40 and 41 of the retainer 13 meet, when inserting the retainer into the housing 12, will allow the flanges 39 to clear the housing.

Thereafter, allowing the retainer to expand until the undulated portions 35 and 36 are in firm contact with the inner diameter wall of the housing will allow the flanges 39 to lock into the grooves 38, thereby preventing axial movement of the retainer. Preferably, the grooves 38 are cut circular whereby they will have varying depths due to the undulations of the inner diameter of the housing.

Figure 5:
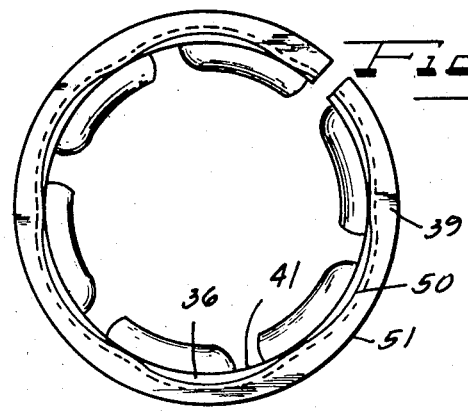
FIG. 5 is an end plan view of the retainer of FIG. 3 in its rolled form.

This can be accomplished either by forming the flange with a constant inner diameter and constant outer diameter with the radial length equal to the minimal depth of the groove. Alternatively, as best illustrated in FIG. 5, the flange 39 can be formed with an undulating inner diameter 50 and a constant outer diameter 51.

Although the ball retainer 13 has been described as formed from a planar sheet rolled to a tubular configuration with a split gap, it is possible to form the retainer from a continuous tube. When so formed, the retainer will not have a split gap, but can still be formed with the undulated portions 35 and 36 at either end thereof to lock against rotation. In such a case, axial movement can be limited either by the provision of a snap ring 52 as best illustrated in FIG. 8 or by spring tabs 53 illustrated in FIGS. 9 through 11. The spring tabs 53 are cut from the end portions 54 of the retainer 13 as by punching at 55 and have out-turned flanges 56 formed at their axially outer ends. The spring tabs can then be radially compressed so that the retainer 13 can be assembled into the housing. After such assembly, the tabs 56 will snap downwardly into the retaining groove 35 to lock against axial movement while radial movement is prevented by the undulations in the axial end portions 54. It is of course to be understood that the spring fingers 53 or the snap ring 52 may be used in connection with a tubularly rolled flat retainer as illustrated in FIG. 3.

It will be understood from the above, therefore, that my invention provides a linear motion bearing having a tubular housing with an undulating interior wall providing circumferentially alternatingly spaced ball loading portions and ball return portions with a ball retainer defining oval ballways telescoped interiorly of the housing, the retainer having undulating portions adjacent either end thereof which index with the inner diameter corrugations of the housing to lock the retainer against rotation. Means such as a tongue and groove, snap ring, or spring fingers are provided and indexed with a housing groove to prevent axial movement of the retainer.

I have also disclosed a method of manufacturing a linear motion anti-friction bearing including a number of methods of forming the housing with the undulating interior wall.

Although the teachings of my invention have herein been discussed with reference to specific theories and embodiments, it is to be understood that these are by way of illustration only and that others may wish to utilize my invention in different designs or applications.

I claim as my invention:

1. The method of making a linear motion bearing which comprises the steps of providing a substantially tubular housing member, broaching the interior of the housing member to form a plurality of circumferentially spaced axially extending grooves defining unloaded ball pathways, the inner diameter of said housing between the said grooves defining axially extended ball loading lands, machining grooves in the inner diameter of said housing adjacent either end thereof, providing an elongated sheet, stamping a plurality of oval ball pathways in said sheet, said ball pathways spaced from one another, the major axis of the said pathways extending transversely of the sheet, the said pathways longitudinally separated from one another, the said pathways having unloaded ball paths comprising stamped bottomed grooves in said sheet and loaded ball paths comprising stamped bottomless grooves in said sheet, each pathway having a loaded ball path and an unloaded ball path, the said ball passageways having transverse ends terminating in spaced relation from the side edges of the said sheet, forming corrugated portions between the said transverse ends and the said sides of the said sheet, said corrugated portions having corrugations extending the longitudinal length of the sheet and terminating in spaced relation from the said sides of the said sheet, bending the said sides of the said sheet in a direction opposite the depth of the said grooves formed to provide the said pathways to provide an out-turned flange at the said sides of the said sheet, rolling the said sheet end to end to provide a tubular retainer with the said flanges extending radially outwardly, filling the said pathways with balls, inserting the said retainer with the said balls into the said housing with the said loaded ball paths radially aligned with the said ball loading lands and the balls in said paths in contact with the said ball loading lands, expanding the said retainer until the said flanges are seated in the said grooves adjacent the ends of the said housing and the said corrugated portions of the said retainer are indexed with the circumferential corrugations of the housing formed by broaching whereby the said retainer is restrained against axial and radial movement within the said housing.

2. A method of making a linear motion bearing which comprises the steps of: forming a housing having an axial bore, the bore defined by varying radius inner diameter on the housing, the varying radii continuing the axial length of the housing, the radii being equal axially and varying circumferentially, forming a retainer having an axial opening, a circumferential wall, an outer surface, and an axial length, forming ballways in said outer surface, parts of said ballways open through said wall, said ballways terminating in spaced relation to axial ends of said wall, forming portions of said wall axially beyond said ballways with a varying radius outer diameter, the varying radius outer diameter matable with the varying radius inner diameter of the housing, forming an intermediate portion of said wall between the said portions substantially tubular except for said ballways, substantially filling said ballways with anti-friction elements, and inserting said retainer in said housing with said portions mating with the inner diameter of the housing.

3. The method of claim 2 wherein the housing is formed by extrusion.

4. The method of claim 2 wherein the housing is formed by forcing a tubular shaped housing member through a die having an internal configuration shaped to provide deformation of the tube inner and outer diameters with said varying radius.

5. The method of claim 4 wherein the undulated tube resulting from the die step has portions of its inner diameter ground to provide circumferentially separated ball loading faces.

6. The method of claim 5 wherein circumferentially separated portions of said outer diameter formed by the said die step are ground from a common center, said circumferentially separated portions located radially beyond inner diameter increased diameter return path areas.

7. The method of claim 5 wherein the tube is formed from a rolled strip of sheet material.

8. The method of claim 2 wherein the housing is formed by first providing a tube having a constant inner diameter, and second, broaching portions of said inner diameter to increase the diameter thereof in circumferentially spaced areas, thereby providing an undulating inner diameter.

9. The method of claim 2 wherein said housing is formed by first forming a tube having a constant inner diameter, receiving said tube around a mandrel having a varying outer surface, constricting the material of said tube into contact with said mandrel and continuing to constrict said tube until said inner diameter of said tube conforms with the undulations of the outer surface of the said mandrel.

10. The method of claim 2 wherein the housing is made by first providing a strip of sheet material having a surface, providing a series of alternating wide and narrow grooves in said surface, said grooves having different depths, the said wide grooves being deeper than the said narrow grooves, and thereafter rolling said strip into tubular form with the said surface comprising the inner diameter surface of the said tube.

* * * * *